United States Patent [19]
Brown et al.

[11] Patent Number: 5,253,893
[45] Date of Patent: Oct. 19, 1993

[54] TRACTOR TRAILER JACKNIFE PREVENTION SYSTEM

[76] Inventors: Theodore R. Brown; Benvinda Brown, both of 67 Ash Park Dr., Stoughton, Mass. 02072

[21] Appl. No.: 872,099

[22] Filed: Apr. 22, 1992

[51] Int. Cl.$^5$ ............................................. B62D 53/06
[52] U.S. Cl. ..................................... 280/432; 280/433
[58] Field of Search ..................... 280/432, 433, 455.1; 188/31, 74, 75, 76

[56] References Cited
U.S. PATENT DOCUMENTS

| | | |
|---|---|---|
| 1,385,030 | 7/1921 | Watt ........................................ 188/31 |
| 4,065,149 | 12/1977 | Roth ..................................... 280/432 |

FOREIGN PATENT DOCUMENTS

| | | | |
|---|---|---|---|
| 0902223 | 1/1954 | Fed. Rep. of Germany ....... | 280/432 |
| 1222358 | 2/1971 | United Kingdom ................ | 280/432 |

Primary Examiner—Margaret A. Focarino
Assistant Examiner—Victor E. Johnson
Attorney, Agent, or Firm—William Nitkin

[57] ABSTRACT

A system operated by the driver of a tractor trailer for preventing the jackknifing of the tractor trailer, the tractor trailer being of the type having a kingpin under the trailer to lock into the fifth wheel mounting plate on the tractor, the system having structure for locking the trailer to the tractor to prevent the trailer's turning in relation to the tractor, with the structure for locking the trailer in a fixed position being activated by the driver when the driver senses that the trailer is starting to jackknife.

4 Claims, 3 Drawing Sheets

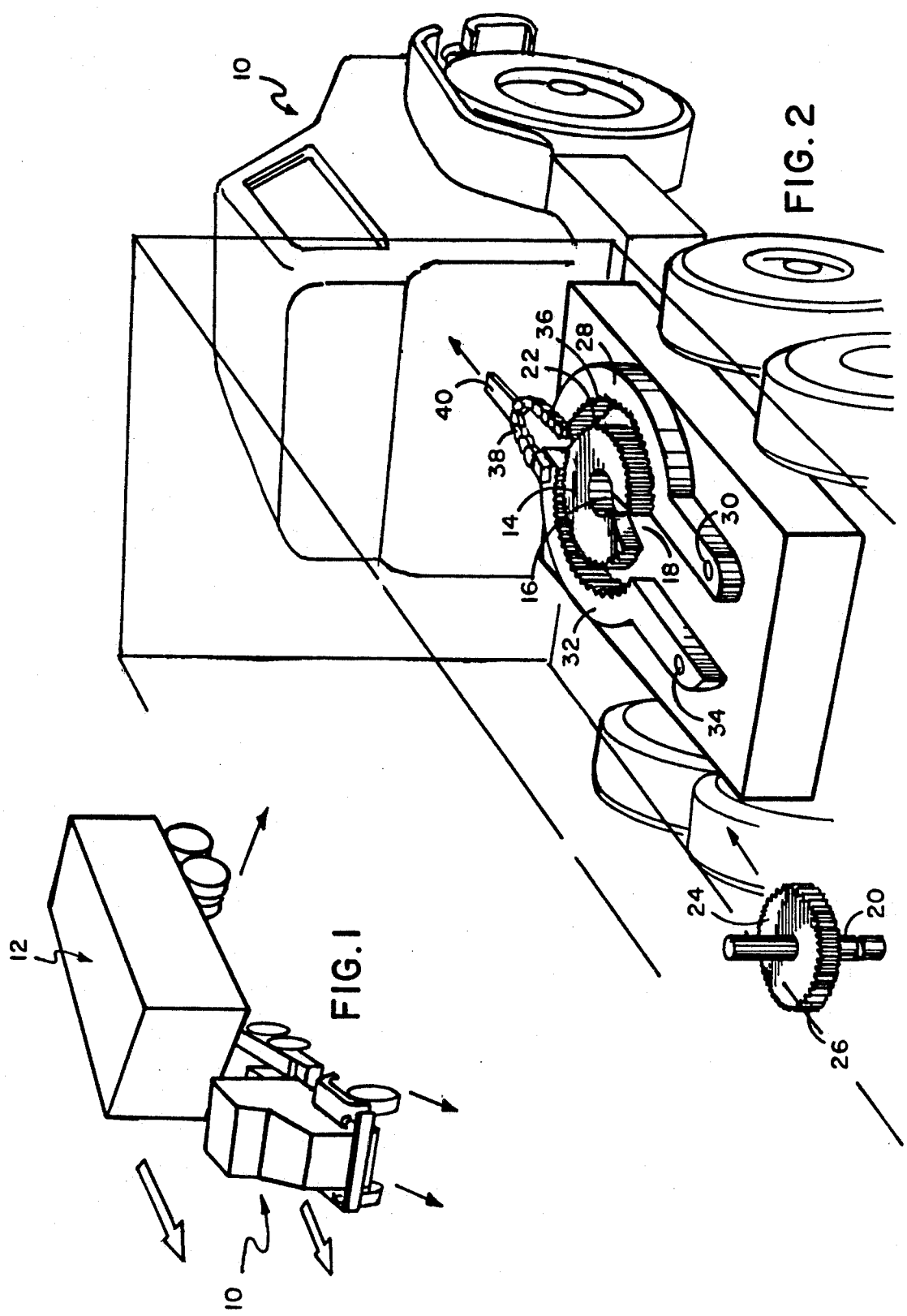

TRACTOR TRAILER JACKNIFE PREVENTION SYSTEM

BACKGROUND OF THE INVENTION

1. Field of the Invention

The system of this invention resides in the area of tractor trailers and more particularly relates to a system to prevent the jackknifing of tractor trailers.

2. Description of the Prior Art

Jackknifing of tractor trailers is a problem occuring when the trailer starts moving independently of the direction of movement of tractor which sideways movement can cause serious accidents such as, for example, causing the tractor trailer to tip over with resulting injuries to the driver and possible accidents with other vehicles.

SUMMARY OF THE INVENTION

It is an object of this invention to provide a system to prevent the jackknifing of tractor trailers. The system works such that when a driver senses that the trailer is starting to get out of control and is moving to the side independently of the forward movement of the tractor, the driver activates the system of this invention to lock the trailer in place so that it can no longer laterally move independently of the tractor. The locked trailer will then remain in a fixed position with the tractor such that the driver can then bring the entire tractor trailer back under control. When the tractor trailer is then back under control, the driver can release the system of this invention which will then allow the trailer to move freely behind the tractor as the tractor drives and steers around turns. The system of this invention also works to control the "crack-the-whip" effect which sometimes occurs when tractor trailers are changing lanes or going over hills.

One embodiment of the system of this invention provides for a toothed ring member disposed around the kingpin on the trailer and utilizes the "fifth wheel" on the tractor, referred to herein as the mounting plate, which mounting plate has a toothed exterior and into which mounting plate the kingpin is engaged. Brake members close around the toothed ring and in some embodiments both the toothed ring and the toothed mounting plate, locking them together when such brake members are engaged by the driver of the vehicle. In another embodiment of this invention the hydraulic braking drums can be utilized to engage against the toothed ring and toothed mounting plate. In yet a further embodiment pins can be driven from the mounting plate of the tractor into a receipt plate on the bottom of the trailer so as to limit the lateral rotation of the trailer when it might be starting to jackknife. In yet a further embodiment a beam mounted on the trailer can be activated to be pushed forward to strike against a mating beam on the rear of the tractor which action will cause the trailer to lock in a fixed position behind the tractor so that it cannot jackknife.

BRIEF DESCRIPTION OF THE DRAWINGS

FIG. 1 illustrates a tractor trailer which has been locked so that the trailer can no longer swing around the tractor but remains in a fixed position moving forward in the direction of the large arrows.

FIG. 2 illustrates a perspective rear view of a tractor and outlined view of a trailer showing one embodiment of the system of this invention.

DESCRIPTION OF THE PREFERRED EMBODIMENT(S)

Figure 3A:
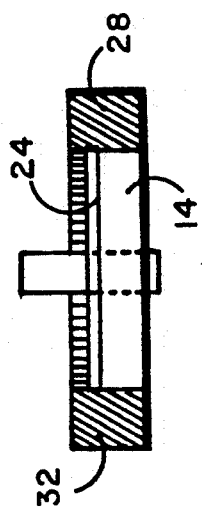
FIG. 3A illustrates a cross-sectional view thrugh a point near the center of the ring member and mounting plate of FIG. 3 mounted adjacent to one another with the braking arms closed thereon.

FIG. 1 illustrates a tractor trailer at the point in time where the driver in tractor 10 senses trailer 12 is starting to move sideways. Shown are thin arrows which indicate the directions of movement of the tractor and the trailer at this point in time. Activating the system of this invention, the driver locks trailer 12 which has started to jackknife to tractor 10 such that the trailer can no longer move in a lateral direction which action prevents jackknifing of the tractor trailer. The thus locked together tractor trailer continues to move in the direction indicated by the larger arrows until the driver feels he has regained control of the tractor trailer. Once control has been regained, the driver can release the locking system of this invention and proceed to drive normally. It should be noted that the locking system of this invention could be utilized in other instances such as when a driver is backing up and wishes to prevent turning of the trailer. Also, the locking system of this invention can be used as an anti-theft device. When the trailer is locked onto the tractor, the tractor trailer cannot be effectively steered around turns in the road because of the length of the locked-together tractor trailer so that a thief could not drive such a tractor trailer for a very far distance. The locking system of this invention can have a key lock to prevent its unauthorized use.

FIG. 2 illustrates a truck consisting of a tractor 10 pulling trailer 12 shown outlined. Trailer 12 has mounted on it a standard kingpin 20 around which is positioned ring member 24. Ring member 20 has a plurality of teeth 26 around its periphery. Mounting plate 14 on tractor 10 has slot 18 which receives kingpin 20 up into aperture 16 in which it is normally engaged for driving. In one embodiment of the system of this invention mounting plate 14 also has teeth 22 around its periphery. The outer diameter of mounting plate 14 is similar to the outer diameter of ring member 24 so that when trailer 12 is joined to tractor 10, teeth 22 and 26 of mounting plate 14 the ring member 24 are in parallel relationship, one above the other. Around teeth 22 and 26 are positioned first and second braking arms 28 and 32 which are hinged respectively on first and second hinge pins 30 and 34 at one end. First and second braking arms 28 and 32 have an interior curvature, each having teeth 36 arrayed on its inner surface adapted to mate with teeth 22 on mounting plate 14 and teeth 26 on ring member 24 when first and second braking arms 28 and 32 are pulled together by the tightening of cable 38. Cable 38 can be tightened by the driver within the cab, for example, by means of a lever or equivalent control means. Such tightening of cable 38 can also be accomplished by hydraulic or pneumatic action, for example, activated by a separately activated line from the air brakes of the truck. The effect, though, of cable 38 being pulled forward is to cause teeth 36 of first and second braking arms 28 and 32 to be pulled by arm 40 inward tightly against teeth 22 and 26, respectively of mounting plate 14 and ring member 24, thereby locking ring member 24 securely in place. Whatever position of rotation trailer 12 is in relation to tractor 10, when the system of this invention is activated, ring member 24 is locked in such position, and trailer 12 cannot rotate any further until the locking means are released by the driver from within the cab of tractor 10. Other equivalent means of retaining ring member 24 in a fixed position can be utilized and some embodiments of such means are described further below.

Figure 3:
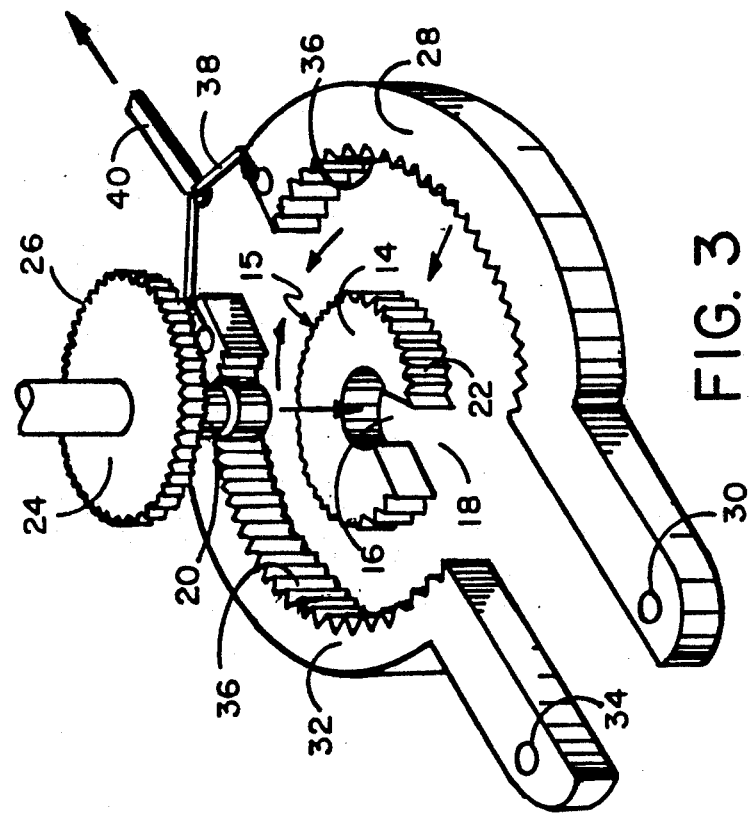
FIG. 3 illustrates a closeup view of the embodiment of the locking system of FIG. 2.

In FIG. 3 is seen an enlarged view of first and second braking arms 28 and 32 with cable 38 which can be pulled forward by arm 40. Cable 38 is flexible and is attached at each end to the ends of first and second braking arms 28 and 32. When cable 38 is pulled forward, it pulls the ends of first and second braking arms 28 and 32 together such that each arm pivots inwardly on first and second hinge pins 30 and 34, respectively. In some instances the system of this invention can be retrofitted on existing tractor trailers. In such instance case ring 15 with teeth 22 on its exterior, as seen in FIG. 3, is installed on standard mounting plate 14. Ring member 24 is provided having the same diameter as that of mounting plate 14.

FIG. 3A illustrates a cross-sectional view showing first and second braking arms 28 and 32 mating against ring member 24 and mounting plate 14 such that they are locked into place, preventing any rotation of ring member 24.

Figure 4:
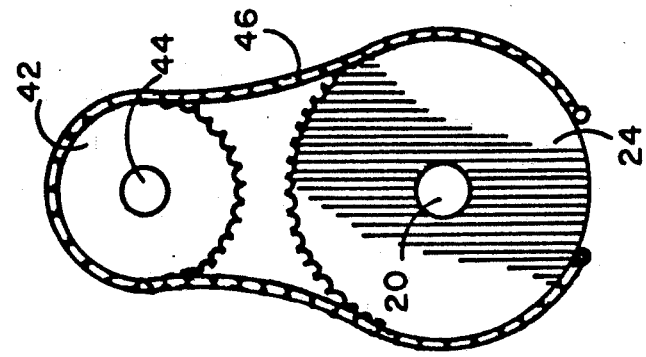
FIG. 4 illustrates an alternative locking system to that seen in FIG. 3.

FIG. 4 illustrates an alternate embodiment of the locking system of this invention using a separate toothed wheel 42 rotatable on shaft 44. This alternate embodiment utilizes drive chain member 46 engaged into the teeth of toothed wheel 24 and is attached at its ends to ring member 26 which can also have mating teeth. Drive chain member 46 is engaged with and extends around toothed wheel 42 which rotates on shaft 44 during normal driving. When toothed wheel 42 is stopped in its rotation by a brake member, not shown, which is controlled by the driver, drive chain member 46 then fixed in position prevents any rotation of ring member 26 thereby holding it in a fixed position and preventing any lateral movement of the trailer.

Figure 5:
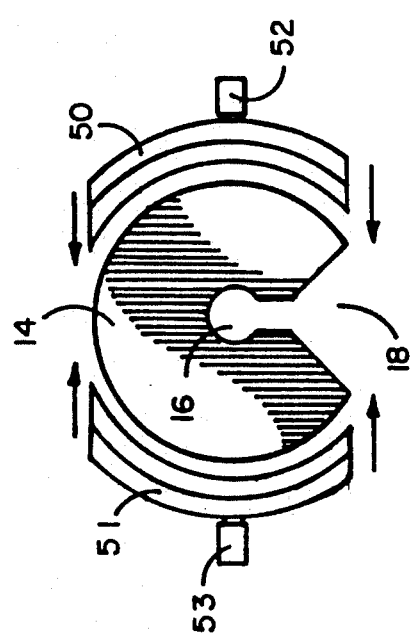
FIG. 5 illustrates a further alternative locking system to that seen in FIGS. 2 and 3.

A yet further embodiment seen in FIG. 5 provides first and second braking pads 50 and 51 which are curved to press against the outer edges of the ring member, not shown in FIG. 5, and mounting plate 14 to lock the ring member and mounting plate in a fixed position. First and second brake pads 50 and 51 can be moved inward by first and second pistons 52 and 53, forcing first and second brake pads 50 and 51 inward such that they securely grab the ring member, not shown, and mounting plate 14 between them.

Figure 6:
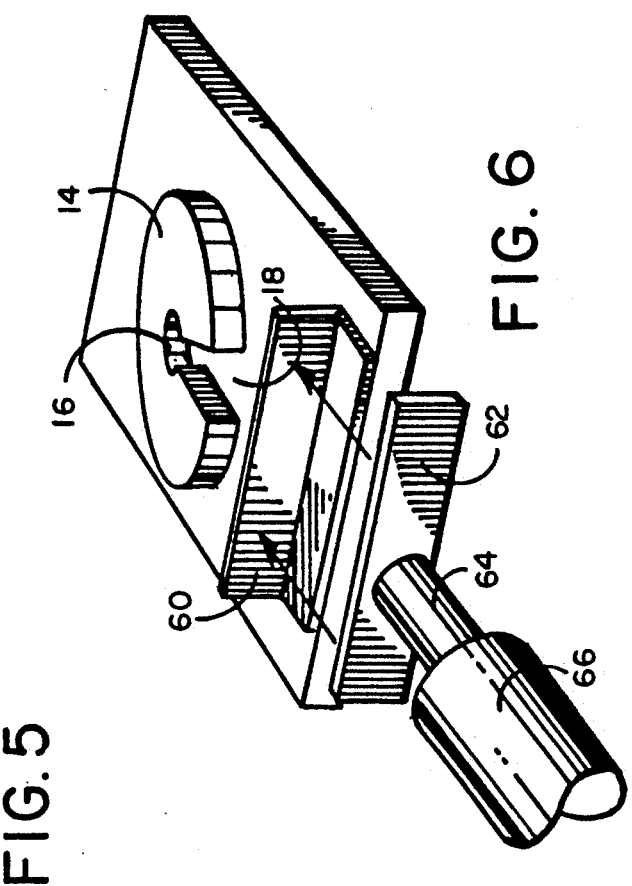
FIG. 6 illustrates a locking system which pushes a beam from the trailer toward the tractor to lock the trailer in place.

A yet further embodiment of the locking system is illustrated in FIG. 6 wherein plate member 62 mounted on shaft 64 operated by piston 66 can be driven forward from the trailer against first plate 60 mounted on the tractor. In this embodiment when second plate 62 meets against first plate 60 on the tractor, the tractor and trailer are locked in position.

Figure 7:
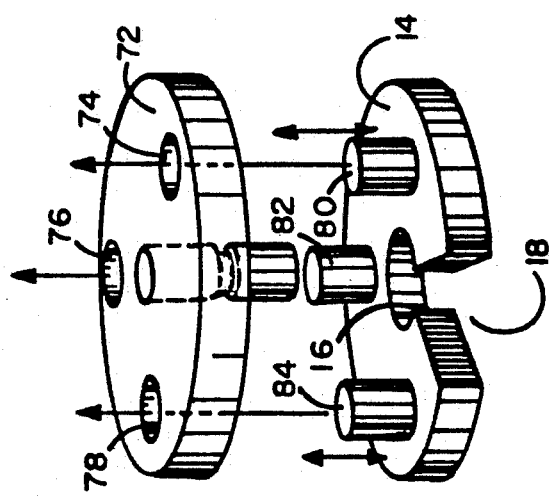
FIG. 7 illustrates a locking system which utilizes pins driven from the mounting plate on the tractor up into a mating plate on the trailer.

In a still further embodiment of the system of this invention seen in FIG. 7, mounting plate 14 can be provided with actuating pins 80, 82 and 84 which in normal position remain retained below the surface of mounting plate 14. These pins can be electrically operated such as being mounted on solenoids to drive them upwards when activated by the driver. The pins can also have equivalent mechanical actuators thereunder which, when the driver engages the locking system, will cause the pins to be driven upward. Ring member 72 positioned around the kingpin is provided with a plurality of apertures 74, 76 and 78 into which actuating pins 80, 82 and 84 engage when they are driven upwards. Once the pins are engaged in ring member 72, the trailer cannot rotate further and is effectively locked in position. Apertures 74, 76 and 78 must be somewhat larger than actuating pins 80, 82 and 84 to enable the pins when the trailer starts to move sideways, to engage into the apertures.

Although the present invention has been described with reference to particular embodiments, it will be apparent to those skilled in the art that variations and modifications can be substituted therefor without departing from the principles and spirit of the invention.

We claim:

1. A system preventing the jackknifing of a tractor trailer operated by a driver wherein said tractor is of the type having a mounting plate having a diameter, said mounting plate having a slot and an aperture disposed therein, said mounting plate having an exterior edge and said trailer is of the type having a kingpin engageable through said slot into said aperture, said system comprising:
    a ring member fixed in position around said kingpin, said ring member having an outer edge and having a diameter substantially equal to and coaxial with the diameter of said mounting plate on said tractor;
    a plurality of teeth positioned around the outer edge of said ring member;
    a plurality of teeth positioned around the exterior edge of said mounting plate;
    braking means partially circumscribing both the exterior edge of said mounting plate and said outer edge of said ring member to engage both said ring member and said mounting plate to lock said trailer in fixed position to said tractor; and
    means to engage said braking means, said engagement means being controlled by said driver.

2. The system of claim 1 wherein said braking means comprises a pair of inwardly curved brake members, each having plurality of teeth arrayed along a respective inner edge, said brake members adapted to close together against said ring member and said mounting plate to lock said trailer in fixed position to said tractor.

3. The system of claim 1 wherein said braking means comprises:
    first and second braking pads adapted to be applied against said ring member and said mounting plate to lock said trailer in fixed position to said tractor.

4. The system of claim 2 wherein said engagement means comprises:
    a cable member extending between said brake members; and
    means to pull said cable member, said pulling means controllable by said driver to pull said brake members together.

* * * * *